Patented Nov. 24, 1942

2,302,828

UNITED STATES PATENT OFFICE 2,302,828

ANTIRACHITICS

Lester Yoder, Ames, Iowa, assignor to Iowa State College Research Foundation, Ames, Iowa, a corporation of Iowa No Drawing. Application July 27, 1939, Serial No. 286,915

20 Claims. (Cl. 260—397.2)

This invention relates to antirachitic substances and to the production thereof.

Antirachitic substances heretofore employed have been prepared chiefly from fish oils. While the fish oil products have been extensively used to fortify food products, the supply of antirachitically-active fish oils is somewhat limited and subject to wide fluctuation. Moreover these oils are gradually becoming more expensive. Therefore there has been a demand in the industry for a process capable of producing antirachitic substances from sources other than fish oils. In order to meet the demand, certain sterols, e. g. ergosterol, have been activated by irradiation or by subjecting them to radio-active emanations or electronic discharges. However, these methods of activation are relatively expensive, complicated and costly apparatus being required for their practice. Consequently these methods have not satisfied the demand for a cheap and simple process for producing antirachitic substances from sources other than fish oils.

British Patents Nos. 307, 709 and 377,721 have disclosed that detergents may be prepared by reacting higher fatty alcohols, such as cetyl alcohol, stearyl alcohol, cholesterol, ceryl alcohol and lauryl alcohol with a sulfonating agent and acetic anhydride. The products of these patents were recognized to have certain detergent properties, among them being the ability to remain in aqueous solution in the presence of calcium and magnesium salts. However, substances having antirachitic properties were never produced by the processes of these patents or by any other chemical methods.

It is the object of this invention to provide a chemical process for the production of antirachitic substances which may be transformed into solid products and the solid products utilized without substantial deterioration in their vitamin activities.

I have discovered that substances having antirachitic properties may be produced by subjecting steroids having positive Liebermann-Burchard tests (Hawk & Bergeim, "Practical Physiological Chemistry," 9th edition, p. 281) to the action of a dehydrating acidogenic composition. The term "steroid" is used herein to include both sterols and derivatives thereof such as esters, ethers and hydrocarbons. The term "dehydrating acidogenic composition" is employed herein to connote compositions having relatively strong acidic properties and relatively strong affinity for water. Thus, in accordance with my invention, Liebermann-Burchard steroids may be treated with compositions containing sulfuric acid, and preferably acetic anhydride, at relatively high temperatures, whereby the required dehydrating acidogenic conditions are produced so that products having excellent antirachitic properties result. Other compositions having dehydrating acidogenic properties may also be employed in the practice of my invention as will more fully appear hereinafter. As is well known, the presently known antirachitic substances have A. O. A. C. potencies substantially equal to or less than their I. R. U. potencies when compared with U. S. P. Reference Cod Liver Oil. In U. S. P. Reference Cod Liver Oil, which is an accepted standard in vitamin D assay work, one U. S. P. unit of vitamin D contained therein is equal to one I. R. U. (International Rat Unit) which, in turn, is equal to one A. O. A. C. (Association of Official Agricultural Chemists) unit. The antirachitic substances produced in accordance with my invention possess the unique property of having A. O. A. C. potencies higher than their I. R. U. potencies, or to be more accurate, the products of my invention are characterized by having an A. O. A. C./U. S. P. vitamin D unit ratio greater than one when compared with U. S. P. Reference Cod Liver Oil. The high A. O. A. C. potencies of my product make them extremely advantageous for use in preparing poultry feed since feeds having the desired potencies may be prepared using a smaller amount of antirachitic substance per rat unit than was heretofore possible. Furthermore the products of my invention may be transformed into solids by neutralization with cation material, which solids remain stable indefinitely and may be utilized without substantial loss of their vitamin activities.

In accordance with my invention any steroid having a positive Liebermann-Burchard test may be subjected to the action of a dehydrating acidogenic composition in order to produce a product having antirachitic properties; thus, for example, Liebermann-Burchard steroids, such as cholesterol, ergosterol, sitosterol, stigmasterol, cholesterilene, sitosterilene, cholesteryl acetate, wool grease and dicholesteryl ether may be treated. It is not essential that pure Liebermann-Burchard steroids be employed, but mixtures containing such steroids, e. g. wool fat alcohols and the like, may also be used. I prefer to employ cholesterol or mixtures containing cholesterol or its derivatives in accordance with my invention on account of their ready availability and on account of the excellent character of the antirachitic substances produced therefrom; however, it is to be understood that my invention is not intended to be limited to the treatment of such steroids, but may be applied to any Liebermann-Burchard steroid.

In carrying out my invention a Liebermann-Burchard steroid may be subjected to the action of a dehydrating acidogenic composition in any suitable manner; the dehydrating acidogenic composition employed may be any composition having relatively strongly acidic properties and a relatively strong affinity for water. I prefer to employ a dehydrating acidogenic composition containing concentrated sulfuric acid, a molar excess of acetic anhydride and a relatively large amount of acetic acid; however, a great many other dehydrating acidogenic compositions may also be used. For example, the following dehydrating acidogenic compositions may be utilized in the practice of my invention: sulfuric acid, oleum, mixtures of sulfuric acid and acetic anhydride, and mixtures thereof with acetic anhydride, sulfoacetic acid and mixtures thereof with acetic anhydride, orthophosphoric acid and mixtures thereof with acetic anhydride, potassium acid sulfate, benzene sulfonic acid, toluene sulfonic acid, phosphoric anhydride, hydrogen chloride, aluminum chloride, aluminum sulfate, zinc chloride with or without acetyl chloride, sulfuryl chloride, antimony tri-chloride, chloro-sulfonic acid and hydrogen bromide. In general it may be said that the dehydrating acidogenic composition employed in the practice of my invention may be any composition selected from the group consisting of sulfur-containing acids, poly-basic mineral acids, mixtures of such acids with acid anhydrides, poly-basic acid anhydrides, acid salts, hydrogen halides and amphoteric metal salts of mineral acids.

The Liebermann-Burchard steroid may be dissolved in a suitable solvent prior to contact with the dehydrating acidogenic composition; for example, I have found that glacial acetic acid, benzene and ether may be used as solvents for the steroids. I prefer to employ solutions of the steroids in the practice of my invention when using a liquid or gaseous dehydrating acidogenic composition. However, if a solid dehydrating acidogenic composition, e. g. potassium acid sulfate, is employed, I prefer to subject the Liebermann-Burchard steroid to the action of the acidogenic composition by fusing the ingredients; this fusing, I have found, effects an intimate contact of the ingredients and accomplishes the production of antirachitic materials in a highly effective manner. In this connection it should be noted that it is preferable to carry out the reaction under substantially anhydrous conditions so that any solvents employed should preferably be anhydrous. In some cases the solvents may co-operate with the other reagents to which the Liebermann-Burchard steroid is subjected in order to produce antirachitics; it is intended to include such solvents within the term "dehydrating acidogenic compositions."

The temperature at which the process of my invention is carried out is particularly important and may vary widely depending upon the ingredients employed. Thus I have found that when operating in accordance with a preferred embodiment of my invention, i. e. when employing a dehydrating acidogenic composition comprising sulfuric acid, and preferably acetic anhydride, the temperature at which the steroid is treated may be between about 70° C. and the boiling point of the solvent; still higher temperatures may be employed if desired by operating under super-atmospheric pressure. On the other hand, I have found that when employing hydrogen chloride as the dehydrating acidogenic composition, temperatures approximating room temperatures may be employed with advantage. Of course, if the steroids are fused with solid dehydrating acidogenic compositions, the temperatures should be approximately the fusing point of the mixed ingredients; e. g. when fusing cholesterol with potassium acid sulfate, the temperature should be about 200° C.

The time of the reaction between the Liebermann-Burchard steroid and the dehydrating acidogenic composition may vary widely depending, for example, upon the particular steroid being treated, upon the nature of the dehydrating acidogenic composition employed and upon the temperature of the reaction. Thus, for example, when reacting cholesterol with a dehydrating acidogenic composition comprising sulfuric acid, acetic acid and acetic anhydride at a temperature of about 85° C., the time of the reaction may be between about 5 and about 6 hours; however, if cholesterol is fused with potassium acid sulfate, two minutes may be sufficient. It is a simple matter, particularly in view of the examples to be given hereinbelow, to adjust the time of contact of the steroid with the dehydrating acidogenic composition in order to attain the most desirable result.

In certain cases it may be desirable to carry out the process of my invention in two or more stages. For example, cholesterol may be treated with chlorsulfonic acid and neutralized with potassium hydroxide in order to produce potassium cholesteryl sulfate, and this product may then be immediately heated to produce an antirachitic substance, or may be stored for as long a time as desired and the antirachitic substance prepared when required. It is to be understood that while intermediate products produced in the practice of certain embodiments of my invention may or may not have antirachitic properties, I intend to include these intermediate substances within the term "antirachitic substances" since these intermediate substances are capable of immediately being converted into the desired antirachitic substances.

The products resulting from the action of dehydrating acidogenic compositions upon the Liebermann-Burchard steroids are acidic in nature. These acidic substances are usually solids having the consistency of a heavy grease at room temperature; when chilled these products become brittle and may be ground to a powder. The potencies of these products may vary widely depending upon the steroid treated, upon the particular acidogenic compound employed and upon the conditions of the reaction; generally it may be said that the potencies of these products may vary from about 20 I. R. U. to about 1,000 or more I. R. U. per gram. These products may be employed as a source of antirachitic activity if desired and have been found to be very stable under all conditions of use. I prefer, however, to neutralize the acidic, antirachitic substances with an alkali or alkaline earth compound, amines or cations, to remove excess acidity and to yield products friable at room temperature. The neutralization tends to reduce the potencies of the products somewhat, the extent of the reduction depending upon the amount of cation material employed; the potencies of the neutralized products may thus vary from about 10 I. R. U. to about 500 or more I. R. U. per gram. The potencies of the neutralized products may be substantially raised by removing the inorganic salts, moisture and excess alkali therefrom; this may be accomplished in any suitable manner, e. g. by taking up the neutralized product in an organic solvent, such as a mixture of carbon tetrachloride and alcohol, capable of dissolving the antirachitically-active substances and precipitating the inorganic compounds and then removing the neutralized product by precipitation into a solvent such as acetone. The calcium and magnesium salts of the products produced by subjecting the steroids to the action of a dehydrating acidogenic composition containing sulfuric acid or a similar sulfur-containing acid are insoluble in water; alkali salts of these products are soluble in water and may be dissolved therein and utilized for addition to aqueous materials with advantage. All the neutralized products of my invention are solids which may be ground to a powder and utilized for addition to solid feeds without danger of any substantial deterioration in their activities.

One of the most striking characteristics of the products of my invention is that they have A. O. A. C. potencies substantially higher than their I. R. U. potencies would indicate; thus the products of my invention may have A. O. A. C./U. S. P. vitamin D unit ratios of from about 2 to about 15 when compared with U. S. P. Reference Cod Liver Oil, depending upon the method of preparation and purification. This unique property possessed by the products of my invention makes them highly suitable for use in furnishing a potent supply of antirachitic material to poultry.

I have further discovered that the neutralized product may be extracted either with acetone or dried and extracted with such solvents as ethyl acetate or ethylene chloride and separated into a salt fraction and an extract. Regardless of the particular solvent used, the salt fraction has a higher A. O. A. C./U. S. P. vitamin D unit ratio than the extract. This extract may be combined with more steroid to produce a larger yield of the salt fraction.

Due to the complex character of the steroids employed in accordance with my invention and to the wide variety of conditions capable of producing activity in the steroids, I have not been able to definitely establish the chemical constitution of all of the products of my invention. I believe that treatment of cholesterol or its derivatives with a dehydrating acidogenic composition comprising sulfuric acid, acetic anhydride, and acetic acid yields cholesterilene mono-sulfonic acid having the probable formula $$C_{27}H_{43}SO_2.OH$$

and that this acid, or its salts, is the active ingredient of the antirachitic substance obtained. However, it is to be understood that I do not wish to be bound to any particular theory regarding the manner in which the antirachitic substances of my invention are produced.

The following examples are illustrative of my invention. Amounts are given in parts by weight.

*Example I*

38 parts of cholesterol were dissolved in 350 parts of glacial acetic acid, the solution was chilled, and 20 parts of concentrated sulfuric acid were stirred into the chilled solution. 20 parts of acetic anhydride were then introduced into the solution and the mixture immediately heated to about 85° C. The temperature of the solution was maintained at 85° C. for about 5 hours, at the end of which time the acetic acid was distilled off under vacuum. The residue was then suspended in hot water, the insoluble material separated by decantation and the solution neutralized with calcium chloride, whereby a precipitate formed. The precipitate was washed with water and dried. It was then extracted with successive portions of acetone; the residue from the extraction was dissolved in a mixture of carbon tetrachloride and alcohol, reprecipitated with acetone, filtered and dried. The dried precipitate was found to have a potency of about 1000 I. R. U. per gram and about 4000 A. O. A. C. units per gram.

*Example II*

38 parts of cholesterilene were treated as described in Example I, whereby a product having substantially the same potency was obtained.

*Example III*

38 parts of sitosterol were treated as described in Example I, whereby a product having a potency of about 65 I. R. U. per gram was obtained.

*Example IV*

38 parts of sitosterilene were treated as described in Example I, whereby a product having a potency of about 140 I. R. U. per gram was obtained.

*Example V*

38 parts of ergosterol were treated as described in Example I except that the calcium salt was not prepared. A product having a potency of about 20 I. R. U. per gram was obtained.

*Example VI*

38 parts of stigmasterol were treated as described in Example I except that the calcium salt was not prepared. A product having a potency of about 30 I. R. U. per gram was obtained.

*Example VII*

38 parts of cholesterol and 50 parts of powdered, freshly fused potassium acid sulfate were mixed and the mixture fused by heating to a temperature of about 200° C. The mixture was maintained at about 200° C. for 2 minutes during which time considerable gas was evolved. The resulting product was then permitted to cool, the cooled mass extracted with ether and the ether extract evaporated to dryness. The residue from the ether extract was found to have a potency of about 40 I. R. U. per gram.

*Example VIII*

38 parts of cholesterilene were dissolved in about 880 parts of benzene, and 18 parts of phosphoric anhydride were added to the solution. The mixture was refluxed for about 2 hours and then evaporated to dryness. A product having a potency of about 20 I. R. U. per gram was obtained.

*Example IX*

38 parts of cholesterol were dissolved in 53 parts of anhydrous ether and 60 parts of absolute alcohol in a dry container chilled with ice, and the solution was then saturated with dry hydrogen chloride gas and permitted to stand for 3 days, during which time the solution was permitted to warm to room temperature. The resulting solution was evaporated to dryness and the residue washed with water; the washed residue was found to have a potency of about 125 I. R. U. per gram.

*Example X*

10 parts of cholesterilene and 50 parts of aluminum chloride were mixed in a casserole and the mixture fused for about 10 minutes at 200° C.; at the end of this time the mass was permitted to cool and was then washed with water, filtered and dissolved in ether. After evaporation of the ether, a residue having a potency of about 25 I. R. U. per gram was obtained.

*Example XI*

10 parts of cholesterilene and 50 parts of anhydrous zinc chloride were treated substantially as in Example VIII, whereby a product having a potency of about 20 I. R. U. per gram was obtained.

*Example XII*

38 parts of cholesterol and 34 parts of powdered, freshly fused aluminum sulfate were mixed in a casserole and the mixture slowly heated to about 150° C. over a period of about 10 minutes and then cooled. The reaction product was extracted with ether, the ether extract filtered and evaporated to dryness. The residue from the ether extract was found to have a potency of about 70 I. R. U. per gram.

*Example XIII*

A mixture containing 38 parts of cholesterol, 350 parts of glacial acetic acid, 23 parts of orthophosphoric acid and 50 parts of acetic anhydride was prepared. This mixture was heated at a temperature of about 85° C. for about 5 hours, and the solution was then evaporated to dryness. A product having a potency of about 20 I. R. U. per gram was obtained.

*Example XIV*

100 parts of the unsaponifiable portion of wool grease containing between about 30% and about 35% cholesterol were mixed with 525 parts of glacial acetic acid; to this mixture were gradually added 34 parts of concentrated sulfuric acid and then 40 parts of acetic anhydride. The resulting mixture was heated for 3 hours at 93° C. The acetic acid was then removed by vacuum distillation and the residue added to water and neutralized with lime. The calcium precipitate thus formed was withdrawn, dried and additional lime added until the material was in a powder form. This product had a potency of about 50 I. R. U. per gram and 425 A. O. A. C. units per gram.

*Example XV*

100 parts of wool grease were added to 260 parts of glacial acetic acid with agitation. To the mixture 20 parts of 20% oleum were gradually added and the resulting mixture heated for 3 hours at 94° C. The mass was then permitted to cool and the acetic acid distilled off. The residue was stirred into water and permitted to stand until separation of sulfonated material from the water took place. The sulfonated material was removed by decantation and dried. It had a potency of about 55 I. R. U. per gram and 425 A. O. A. C. units per gram.

*Example XVI*

A solution of 50 parts of cholesterol in about 370 parts of dry chloroform was added to a chilled solution containing 750 parts of dry chloroform, 150 parts of dry pyridine and 36 parts of chlorsulfonic acid, and the mixture stirred for 15 minutes at room temperature. The mixture was then refluxed for 2 hours and evaporated to dryness under a vacuum. The residue thus obtained was suspended in water and a solution of 50 parts of potassium hydroxide in 100 parts of water added to the suspension. The aqueous mass was then stirred for 15 minutes, the salt filtered therefrom and washed with water, alcohol and finally ether. The dry salt was then heated to 200° C. for 12 hours, whereby a product having an antirachitic potency of about 40 I. R. U. per gram was obtained.

*Example XVII*

38 parts of cholesterilene were suspended in 350 parts of acetic acid and 11 parts of sulfuric acid were added thereto. 17 parts of acetic anhydride were then gradually stirred into the mixture at a temperature of about 25° C. After about 2 or 3 hours standing, the solution was stirred into 50 parts of cold water. Calcium oxide was then added to the solution until precipitation was complete; the precipitate was then separated and dried. The dried precipitate was then taken up in absolute methyl alcohol and treated with sufficient sulfuric acid to decompose the calcium salt. The solution was then filtered and evaporated under a vacuum. The residue upon heating in an acetic acid solution at 85° C. for from 4 to 5 hours became antirachitically active, having a potency of about 210 I. R. U. per gram.

*Example XVIII*

100 parts of cholesterol were dissolved in 340 parts of glacial acetic acid and 52 parts of 20% oleum were gradually added to the solution. The resulting mixture was heated at about 95° C. for about 3½ hours. The acetic acid was then distilled off under a vacuum, whereby a residue having an antirachitic potency of about 260 I. R. U. per gram was obtained. This product had an A. O. A. C. potency of about 1000.

It will be evident from the above description that my invention provides a simple and effective manner of effecting the production of antirachitic substances. My invention utilizes readily available chemical materials and may be practiced in ordinary plant equipment, thereby obviating the necessity of employing expensive and complicated irradiation apparatus. Furthermore, my invention furnishes a method for activating any Liebermann-Burchard steroid; whereas the irradiation method is limited to the activation of very few comparatively expensive sterols. My invention, therefore, represents an important contribution to the art of obtaining antirachitically-active substances.

Since certain changes may be made in the above product and different embodiments of the invention could be made without departing from the scope thereof, it is intended that all matter contained in the above description shall be interpreted as illustrative and not in a limiting sense.

This application is a continuation-in-part of U. S. applications Serial Nos. 736,615 and 64,186, filed July 23, 1934 and February 13, 1936, respectively.

Having described my invention, what I claim as new and desire to secure by Letters Patent, is:

1. A process for the preparation of substances having antirachitic properties which comprises subjecting a Liebermann-Burchard steroid to the action of a dehydrating acidogenic composition, and continuing the action to create an antirachitic potency in excess of 20 I. R. U. vitamin D per gram.

2. A process for the preparation of substances having antirachitic properties which comprises subjecting a Liebermann-Burchard sterol to the action of a dehydrating acidogenic composition, and continuing the action to create an antirachitic potency in excess of 20 I. R. U. vitamin D per gram.

3. A process for the preparation of substances having antirachitic properties which comprises subjecting a Liebermann-Burchard steroid to the action of a dehydrating acidogenic composition for a time and at a temperature sufficient to produce a product having a potency of at least 20 I. R. U. per gram.

4. A process for the preparation of substances having antirachitic properties which comprises subjecting a Liebermann-Burchard steroid to the action of a dehydrating acidogenic composition selected from the group consisting of mixtures of polybasic mineral acids and acid anhydrides, polybasic acid anhydrides, acid salts and hydrogen halides, and continuing the action to create an antirachitic potency in excess of 20 I. R. U. vitamin D per gram.

5. A process for the preparation of substances having antirachitic properties which comprises subjecting a Liebermann-Burchard steroid to the action of a dehydrating acidogenic composition comprising essentially a sulfur-containing acid, and continuing the action to create an antirachitic potency in excess of 20 I. R. U. vitamin D per gram.

6. A process for the preparation of substances having antirachitic properties which comprises subjecting a Liebermann-Burchard steroid to the action of a dehydrating acidogenic composition comprising essentially sulfuric acid, and continuing the action to create an antirachitic potency in excess of 20 I. R. U. vitamin D per gram.

7. A process for the preparation of substances having antirachitic properties which comprises subjecting a Liebermann-Burchard steroid to the action of a dehydrating acidogenic composition comprising essentially sulfuric acid and acetic anhydride, and continuing the action to create an antirachitic potency in excess of 20 I. R. U. vitamin D per gram.

8. A process for the preparation of substances having antirachitic properties which comprises subjecting a Liebermann-Burchard steroid to the action of a dehydrating acidogenic composition comprising essentially sulfuric acid, acetic anhydride and acetic acid, and continuing the action to create an antirachitic potency in excess of 20 I. R. U. vitamin D per gram.

9. A process for the preparation of substances having antirachitic properties which comprises forming a solution of cholesterol in a relatively large amount of glacial acetic acid, adding concentrated sulfuric acid and acetic anhydride to the solution, heating the mixture to a temperature above about 70° C. for more than five hours and evaporating the volatile substances from the reaction mass.

10. A process for the preparation of substances having antirachitic properties which comprises subjecting a Liebermann-Burchard steroid to the action of a dehydrating acidogenic substance comprising essentially sulfo-acetic acid, and continuing the action to create an antirachitic potency in excess of 20 I. R. U. vitamin D per gram.

11. A process for the preparation of substances having antirachitic properties which comprises fusing a Liebermann-Burchard steroid with a dehydrating acidogenic composition comprising essentially an acid salt.

12. A process for the preparation of substances having antirachitic properties which comprises fusing a Liebermann-Burchard steroid with potassium acid sulfate.

13. A synthetic antirachitic substance having an A. O. A. C./U. S. P. vitamin D unit ratio greater than one when compared with U. S. P. Reference Cod Liver Oil, said substance having been prepared by subjecting a Liebermann-Burchard steroid to the action of a dehydrating acidogenic composition.

14. A synthetic antirachitic substance having an A. O. A. C./U. S. P. vitamin D unit ratio greater than one when compared with U. S. P. Reference Cod Liver Oil, said substance having been prepared by subjecting a Liebermann-Burchard steroid to the action of a dehydrating acidogenic composition, comprising essentially a sulfur-containing acid.

15. A synthetic antirachitic substance having an A. O. A. C./U. S. P. vitamin D unit ratio greater than one when compared with U. S. P. Reference Cod Liver Oil, said substance having been prepared by subjecting a Liebermann-Burchard steroid to the action of a dehydrating acidogenic composition, comprising essentially sulfuric acid.

16. A synthetic antirachitic substance having an A. O. A. C./U. S. P. vitamin D unit ratio greater than one when compared with U. S. P. Reference Cod Liver Oil, said substance having been prepared by subjecting a Liebermann-Burchard steroid to the action of a dehydrating acidogenic composition, comprising essentially a sulfur-containing acid and acetic anhydride.

17. A synthetic antirachitic substance having an A. O. A. C./U. S. P. vitamin D unit ratio greater than one when compared with U. S. P. Reference Cod Liver Oil, said substance having been prepared by subjecting a Liebermann-Burchard steroid to the action of a dehydrating acidogenic composition, comprising essentially a sulfur-containing acid acetic anhydride and acetic acid.

18. A synthetic antirachitic substance having an A. O. A. C./U. S. P. vitamin D unit ratio greater than one when compared with U. S. P. Reference Cod Liver Oil, said substance having been prepared by subjecting a Liebermann-Burchard steroid to the action of a dehydrating acidogenic composition, comprising essentially sulfo-acetic acid.

19. A synthetic antirachitic substance having an A. O. A. C./U. S. P. vitamin D unit ratio greater than one when compared with U. S. P. Reference Cod Liver Oil, said substance having been prepared by fusing a Liebermann-Burchard steroid with an acid salt.

20. A synthetic antirachitic substance produced in accordance with claim 2.

LESTER YODER.